United States Patent
Sethi

(10) Patent No.: US 12,307,836 B2
(45) Date of Patent: May 20, 2025

(54) DATA TRANSFER SYSTEM AND METHOD FOR AUTOMOTIVE DIAGNOSTICS AND SERVICE

(71) Applicant: Fieldpulse LLC, Oakland Township, MI (US)

(72) Inventor: Indermohan S. Sethi, Oakland Township, MI (US)

(73) Assignee: FIELDPULSE LLC, Oakland, MI (US)

( * ) Notice: Subject to any disclaimer, the term of this patent is extended or adjusted under 35 U.S.C. 154(b) by 0 days.

(21) Appl. No.: 18/512,639

(22) Filed: Nov. 17, 2023

(65) Prior Publication Data

US 2024/0153324 A1 May 9, 2024

Related U.S. Application Data

(63) Continuation of application No. 17/156,157, filed on Jan. 22, 2021, now Pat. No. 11,830,298.

(51) Int. Cl.
*G07C 5/08* (2006.01)
*G06V 30/148* (2022.01)
*G07C 5/12* (2006.01)

(52) U.S. Cl.
CPC ......... *G07C 5/0825* (2013.01); *G06V 30/153* (2022.01); *G07C 5/0808* (2013.01); *G07C 5/12* (2013.01)

(58) Field of Classification Search
CPC ...... G07C 5/0825; G07C 5/0808; G07C 5/12; G06V 30/153
See application file for complete search history.

(56) References Cited

U.S. PATENT DOCUMENTS

| | | | | |
|---|---|---|---|---|
| 2007/0244611 A1* | 10/2007 | Brozovich | ............. | G07C 5/008 701/31.5 |
| 2008/0208403 A1* | 8/2008 | Bertosa | .................. | G06F 17/00 701/31.4 |
| 2012/0209470 A1* | 8/2012 | Gilbert | ................. | G06Q 10/087 707/769 |
| 2012/0226408 A1* | 9/2012 | Miller | ..................... | B60R 16/02 701/33.2 |
| 2014/0075362 A1* | 3/2014 | Gray | .................... | G07C 5/0808 715/772 |
| 2014/0129077 A1* | 5/2014 | Selkirk | .............. | G05B 23/0216 701/31.4 |
| 2015/0039176 A1* | 2/2015 | Fish | ....................... | G07C 5/008 701/31.6 |
| 2017/0193576 A1* | 7/2017 | Fish | ....................... | G07C 5/008 |

(Continued)

*Primary Examiner* — Joseph J Dallo
(74) *Attorney, Agent, or Firm* — Olav M. Underdal; IDP Patent Services

(57) ABSTRACT

A diagnostic data transfer system includes: a diagnostic tool which includes a plurality of user dialogues displaying diagnostic data values, a diagnostic data transfer device configured to extract the diagnostic data values from an image of the diagnostic tool, and a diagnostic data transfer server configured to author and store authored rules, such that the diagnostic data values can be transformed into an actual measurement data representation using the authored rules. Also disclosed is a method for diagnostic data transfer, including: capturing an image, identifying selected user dialogue, retrieving authored rule, optically scanning, and storing measurement field.

20 Claims, 7 Drawing Sheets

(56) References Cited

U.S. PATENT DOCUMENTS

2018/0190041 A1* 7/2018 Hanson ............... G07C 5/0825
2018/0190043 A1* 7/2018 Dominic ............... G07C 5/085
2021/0374599 A1* 12/2021 Kozloski ............... G06N 20/00

* cited by examiner

Diagnostic Data Transfer System

Diagnostic Data Transfer Server

Diagnostic Data Transfer Device

Diagnostic Tool Database

Actual Measurement Data Representation

Method for Diagnostic Data Transferring

DATA TRANSFER SYSTEM AND METHOD FOR AUTOMOTIVE DIAGNOSTICS AND SERVICE

CROSS-REFERENCE TO RELATED APPLICATIONS

This application is a Continuation of U.S. Non-Provisional application Ser. No. 17/156,157, filed Jan. 22, 2021; which is hereby incorporated herein by reference in its entirety.

FIELD OF THE INVENTION

The present invention relates generally to the field of automotive diagnostics, service, and testing; and more particularly to methods and systems for communicating automotive service and diagnostic data.

BACKGROUND OF THE INVENTION

A variety of diagnostic tools and testers are used in the automotive industry for diagnosing fault conditions and testing for safe configuration of vehicles.

Such diagnostic tools and testers may connect with vehicles using standardized communication protocols, and some limited methods available for transmitting acquired measurement information from the diagnostic tools and testers for further analysis in other systems, such as service management systems used by vehicle repair shops. However, existing interfacing methods require complex development and integration of wired or wireless connections and may require special development for each tool or device. Therefore, such information is often transmitted manually, if at all.

As such, considering the foregoing, it may be appreciated that there continues to be a need for novel and improved devices and methods for communicating automotive service and diagnostic data.

SUMMARY OF THE INVENTION

The foregoing needs are met, to a great extent, by the present invention, wherein in aspects of this invention, enhancements are provided to the existing model of diagnostic & testing data transferring.

In an aspect, a diagnostic data transfer system can include:
a) a diagnostic tool or tester, which can include a tool screen and a plurality of user dialogues for display on the tool screen; and
b) a diagnostic data transfer device;
wherein the diagnostic data transfer device can be configured to enable a user to capture an image of a selected user dialogue in the plurality of user dialogues, wherein the selected user dialogue can include a plurality of displayed diagnostic data values;
such that the diagnostic data transfer device can be configured to extract the plurality of diagnostic data values from the image and transform the image into an actual measurement data representation.

In a related aspect, the diagnostic data transfer device can further include:
a) a plurality of authored rules, such that each authored rule in the plurality of authored rules can be associated with a user dialogue in the plurality of user dialogues;
wherein the diagnostic data transfer device can extract the plurality of diagnostic data values by using a corresponding authored rule in the plurality of authored rules, wherein the corresponding authored rule can be associated with the selected user dialogue of the diagnostic tool.

In another related aspect, the diagnostic data transfer system can further include:
a) a diagnostic data transfer server, which can be configured to author and store the plurality of authored rules; and receive, store, and transfer actual measurement data representations.

In yet another related aspect, the diagnostic data transfer system can further include:
a) a service management system, wherein the diagnostic data transfer server can be configured to send the actual measurement data representation to the service management system for processing of the actual measurement data representation in the service management system.

In a related aspect, a diagnostic data transfer device can further include:
a) a processor;
b) a non-transitory memory;
c) an input/output;
d) a camera, which can be configured to capture the image;
e) a device screen, which can be configured to display the actual measurement data representation;
f) an image interpreter, which can be configured to locate the plurality of diagnostic data values in the image;
g) a data manager, which can be configured to extract the plurality of diagnostic data values from the image; all connected via
h) a data bus;

In another related aspect, a diagnostic data transfer server can further include:
a) a processor;
b) a non-transitory memory;
c) an input/output component;
d) an authoring component, which can create and edit the authored rules that define how the diagnostic data values is to be interpreted once the image is taken;
e) a diagnostic tool database, which can store the plurality of authored rules;
f) data measurement storage, which can store the actual measurement data representations; all connected via
g) a data bus.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 18 is an illustration of a data flow for a diagnostic data transfer system, according to an embodiment of the invention.

DETAILED DESCRIPTION

Figure 1A:
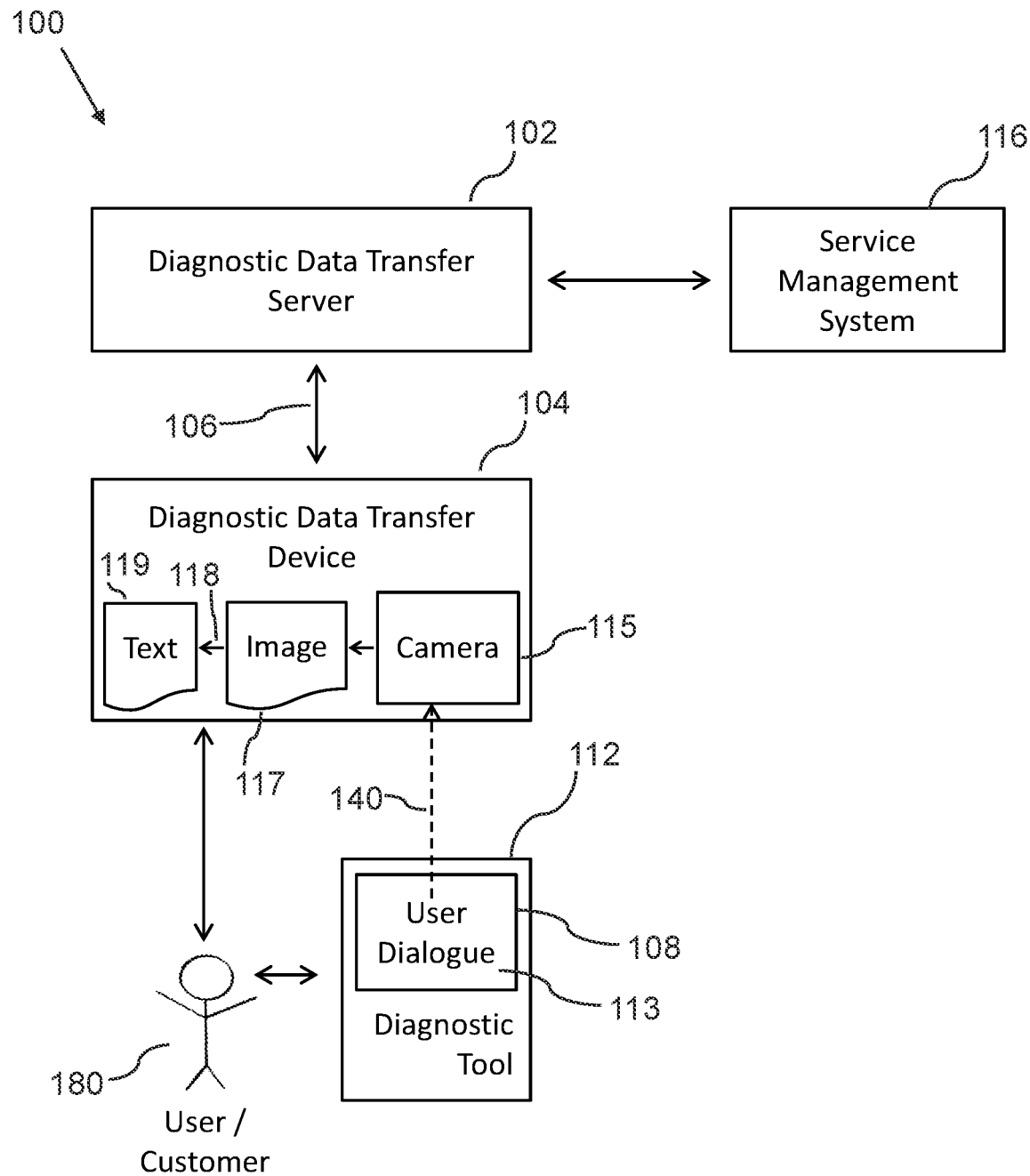
FIG. 1A is a schematic diagram illustrating a diagnostic data transfer system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a diagnostic data transfer system 100 with reference to FIG. 1A, in such manner that like reference numerals refer to like components throughout; a convention that we shall employ for the remainder of this specification.

In an embodiment a diagnostic data transfer system 100 can include:
a) a diagnostic tool 112, which can include a tool screen 108 and a plurality of user dialogues 113 for display on the tool screen 108; and
b) a diagnostic data transfer device 104;
wherein the diagnostic data transfer device 104 can be configured to enable a user 180 to capture 140 an image 117 of a selected user dialogue 113 in the plurality of user dialogues 113, wherein the selected user dialogue 113 can be displayed on the tool screen 108 of the diagnostic tool 112, wherein the selected user dialogue 113 can include a plurality of displayed diagnostic data values 114;
such that the diagnostic data transfer device 104 can be configured to extract the plurality of diagnostic data values 114 from the image 117 and transform the image 117 into an actual measurement data representation 120, which comprises the plurality of diagnostic data values 114.

In various related embodiments, the diagnostic tool 112 should be interpreted broadly, such that the diagnostic tool 112 can include automotive diagnostic tools (such as scan tools), testers (such as a tire pressure/TPMS or battery testers) and service equipment (such as AC machines or alignment machines).

In a related embodiment, the diagnostic data transfer device 104 can further include:
a) a plurality of general authored rules 134, such that each authored rule 134 in the plurality of general authored rules 134 can be associated with a user dialogue 113 in the plurality of user dialogues 113;
wherein the diagnostic data transfer device 104 can extract the plurality of diagnostic data values 114 by using a general authored rule 134 in the plurality of general authored rules 134, wherein the general authored rule 134 can be associated with the selected user dialogue 113 of the diagnostic tool 112.

In a related embodiment, the diagnostic data transfer system 100 can further include:
a) a diagnostic data transfer server 102, which can be configured to author and store the plurality of authored rules 134; and receive, store, and transfer actual measurement data representations 120.

In another related embodiment, the diagnostic data transfer server 102 can be used to author rules to interpret images, receive interpreted data for detailed analysis, store results, and communicate with the diagnostic data transfer device 104. These rules can then be pushed as an update to a local user device 104.

In a further related embodiment, the diagnostic data transfer server 102 can send the actual measurement data representation 120 to the diagnostic data transfer device 104 to be presented locally to the user 180 on a device screen 128.

In yet another related embodiment, the diagnostic data transfer system 100 can further include:
a) a service management system 116, wherein the diagnostic data transfer server 102 can be configured to send the actual measurement data representation 120 to the service management system 116 for processing of the actual measurement data representation 120 in the service management system 116.

Figure 1B:
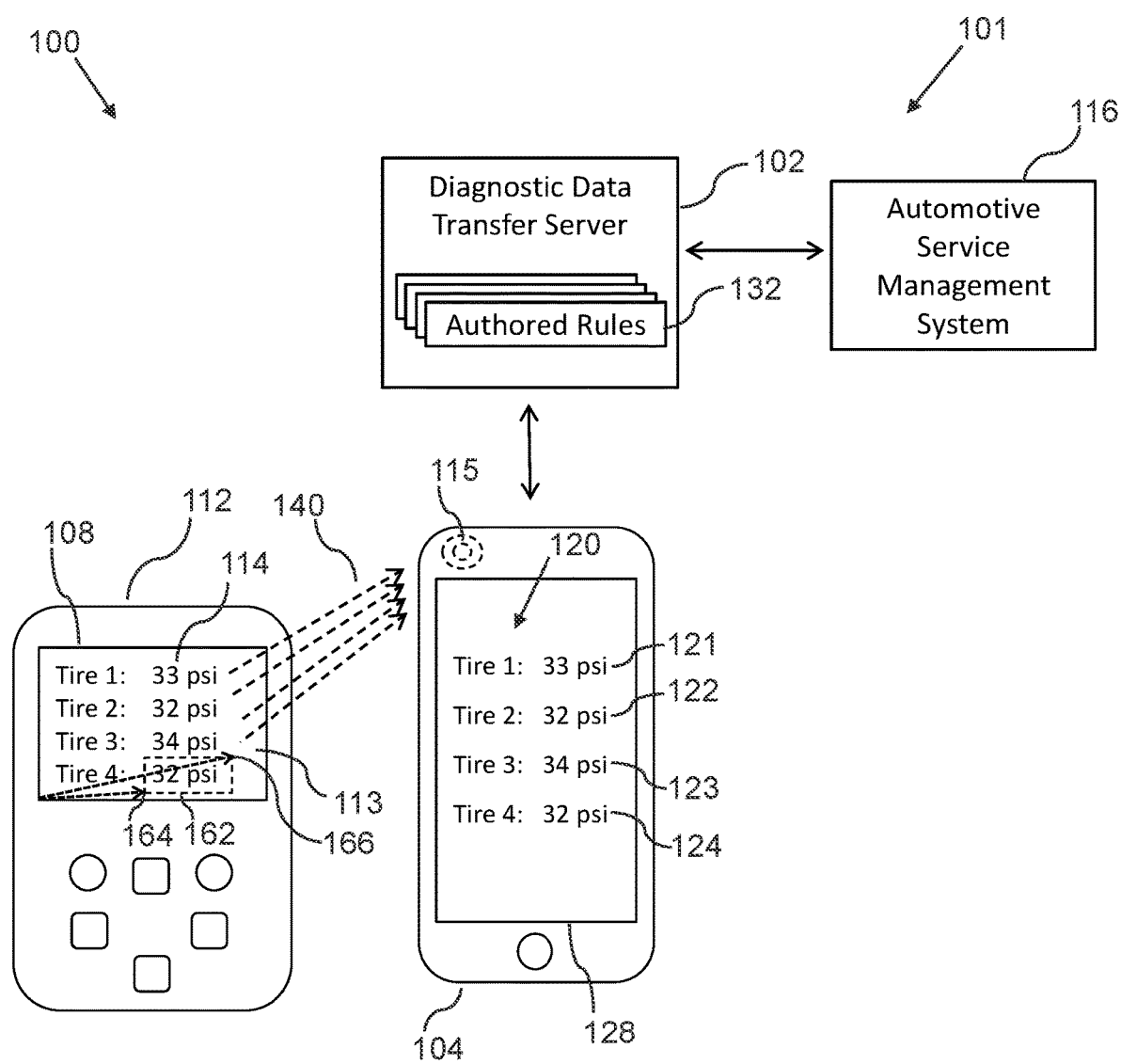

In a related embodiment, as shown in FIG. 1B, showing a data flow for the diagnostic data transfer system 100, the diagnostic data transfer device 104 can be used to transfer diagnostic data value 114 from a tester or a diagnostic tool 112 by taking an image (e.g. with a phone) of the optical display 108 on the tester or the diagnostic tool 112 or of the whole tester or diagnostic tool 112 itself. Diagnostic data values 114 are interpreted from the image taken using the authored rules 134 and presented as an actual measurement data representation 120 on a device screen 128 and transmitted to a server (such as an automotive service management system 116), $3^{rd}$ party application, or printer.

In another related embodiment, the displayed diagnostic data values 114 on the selected user dialogue 113 of the diagnostic tool 112 can belong to the automotive industry, such that, for example, the displayed diagnostic data values 114 can include tire pressure measurements 121, 122, 123, 124;
wherein the actual measurement data representation 120 can represent the tire pressure measurements 121, 122, 123, 124 of four tires on a car, such that each tire pressure measurement 121, 122, 123, 124 in the actual measurement data representation 120 can include an actual measured value, a type, such as Tire 1, Tire 2, etc., and a measurement unit, such as pounds per square inch (PSI), as shown in FIG. 18.

Figure 2:
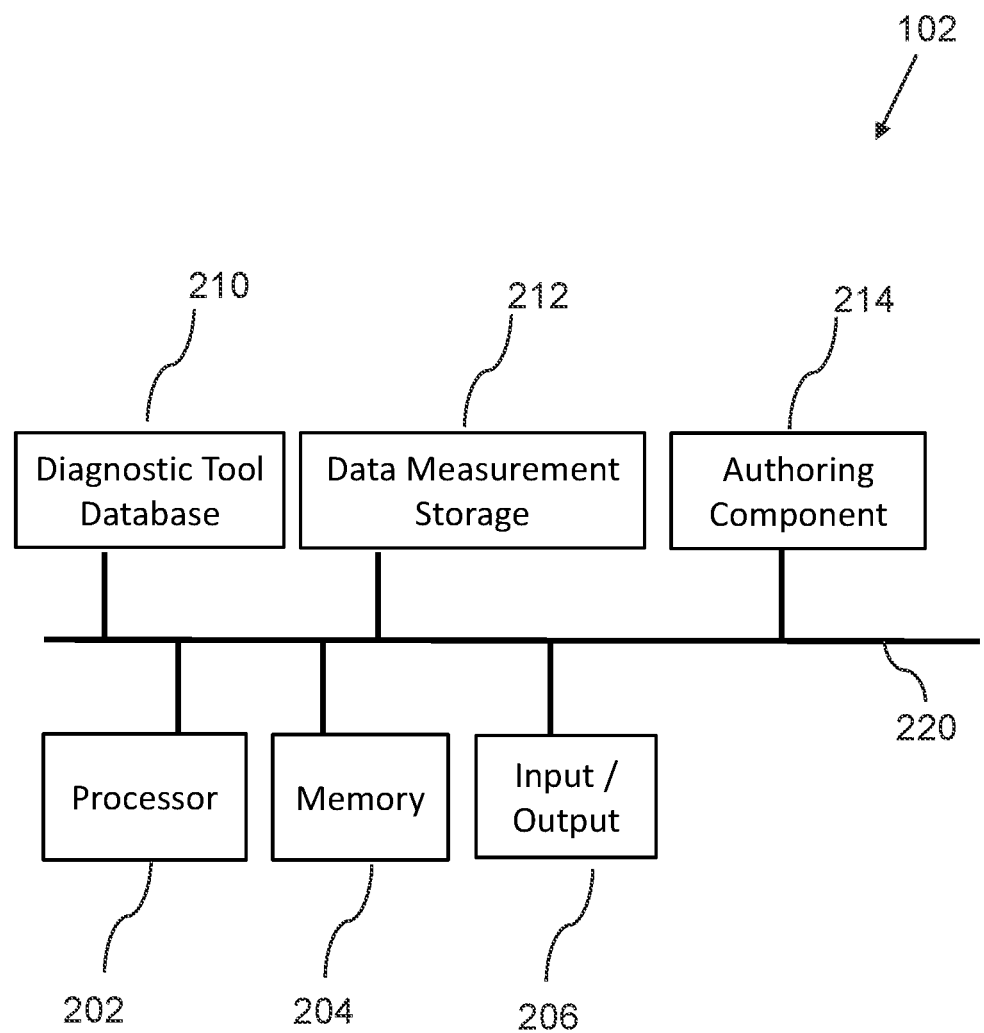
FIG. 2 is a schematic diagram illustrating a diagnostic data transfer server, according to an embodiment of the invention.
Figure 3:
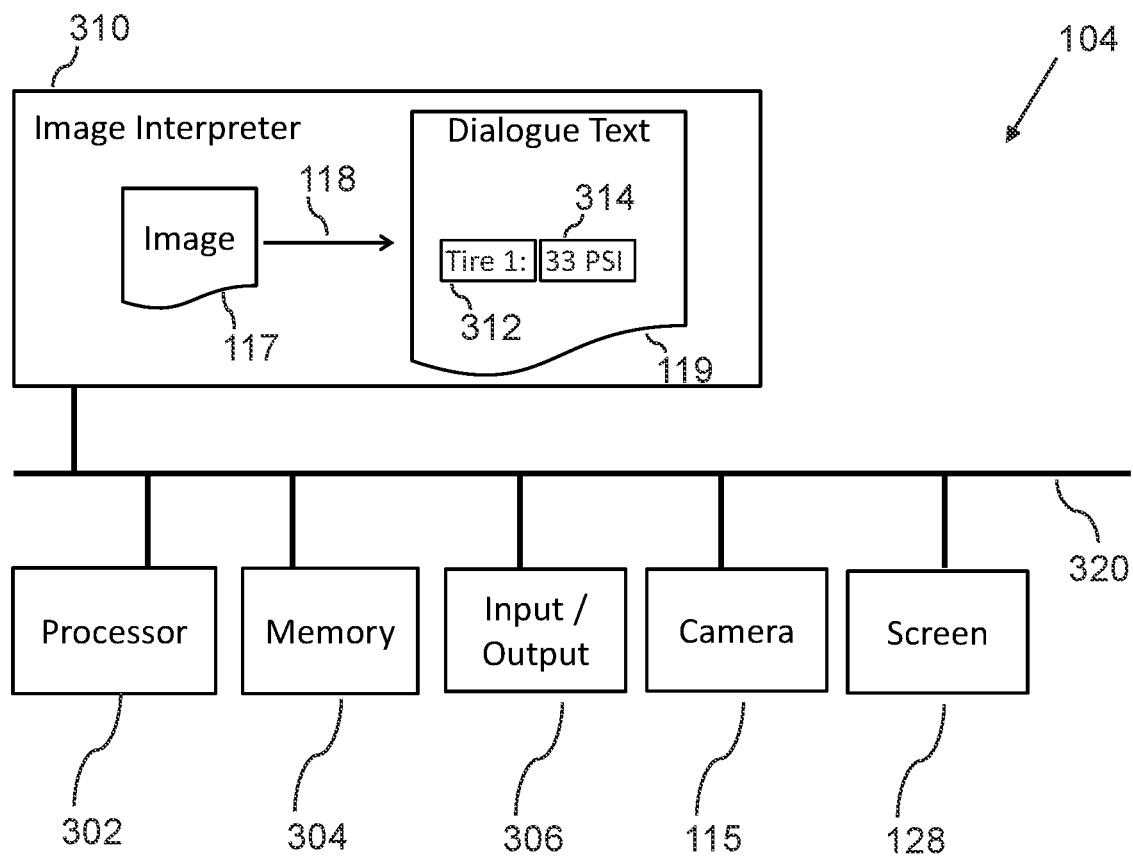
FIG. 3 is a schematic diagram illustrating a diagnostic data transfer device, according to an embodiment of the invention.
Figure 4A:
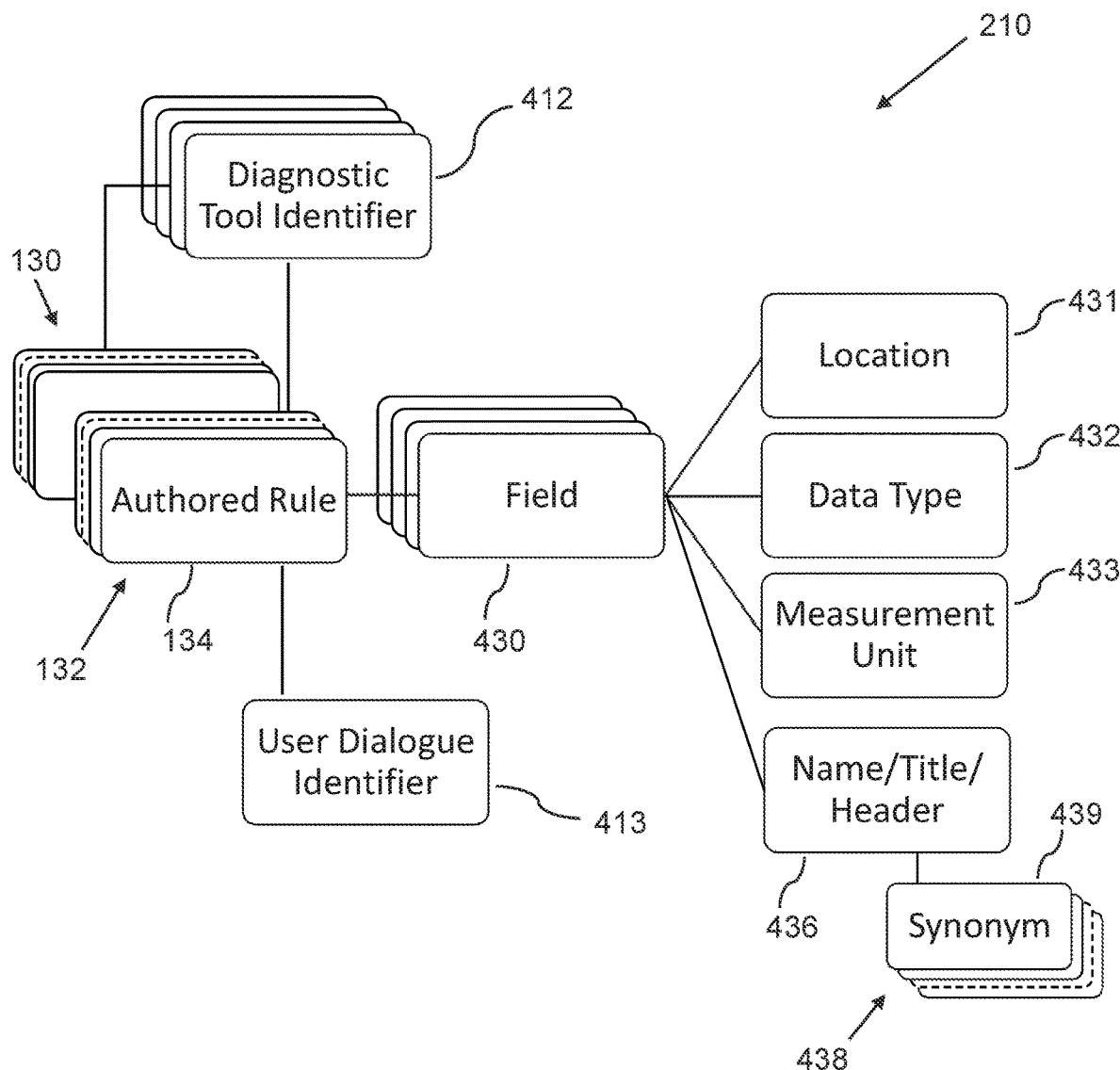
FIG. 4A is a schematic diagram illustrating a diagnostic tool database structure, according to an embodiment of the invention.
Figure 4B:
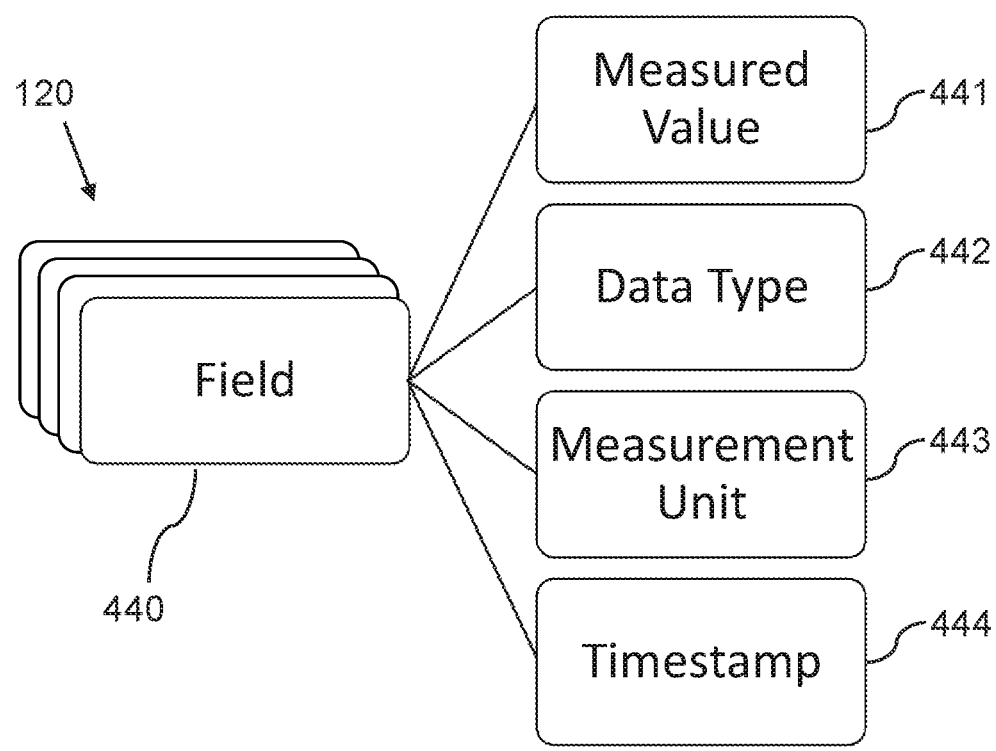
FIG. 4B is a schematic diagram illustrating an actual measurement data representation structure, according to an embodiment of the invention.

In a related embodiment, as shown in FIG. 3, a diagnostic data transfer device 104 can further include:
a) a processor 302;
b) a non-transitory memory 304;
c) an input/output 306;
d) a camera 115, which can be configured to capture 140 the image 117;
e) a device screen 128, which can be configured to display the actual measurement data representation 120;
f) an image interpreter 310, which can be configured to extract the plurality of diagnostic data values 114 from the image 117; all connected via
g) a data bus 320;

In a related embodiment, as shown in FIG. 2, a diagnostic data transfer server 102 can further include:
a) a processor 202;
b) a non-transitory memory 204;
c) an input/output component 206;
d) an authoring component 214, which can create and edit the authored rules 134 that define how the diagnostic data values 114 is to be interpreted once the image is taken;
e) a diagnostic tool database 210, which stores the plurality of authored rules 134;
f) data measurement storage 212, which stores the actual measurement data representations 120; all connected via
g) a data bus 220.

In a related embodiment, the diagnostic data transfer device 104 can further include:
a) a diagnostic tool database 210, which can include:
  i. a plurality 130 of rule sets 132, wherein each rule set 132 can be associated with a diagnostic tool identifier 412, which corresponds to a corresponding diagnostic tool 112, wherein each rule set 132 can include:
    a plurality of corresponding authored rules 134, wherein each corresponding authored rule 134 can be associated with a user dialogue identifier 413, which corresponds to a corresponding user dialogue 113 of the corresponding diagnostic tool 112;
  wherein the diagnostic data transfer device 104 can be configured to identify a selected diagnostic tool 112 and a selected user dialogue 113 of the selected diagnostic tool 112;
  such that the diagnostic data transfer device 104 can be configured to retrieve a corresponding authored rule 134 from the diagnostic tool database 210, wherein the corresponding authored rule 134 can be associated with the selected user dialogue 113 of the selected diagnostic tool 112.

In a related embodiment, the diagnostic data transfer device 104 can be configured to enable a user 180 to manually select a selected diagnostic tool 112 and a selected user dialogue 113 of the selected diagnostic tool 112, for example by lookup in the diagnostic tool database 210.

In another related embodiment, the image interpreter 310 of the diagnostic data transfer device 104 can be configured to recognize the manufacturer make and model of the diagnostic tool 112 and the selected user dialogue 113 in the image using an image recognition algorithm, such that the image recognition algorithm can automatically recognize the diagnostic tool 112 and the user dialogue 113 in the image by comparing to a diagnostic tool database 210 comprising reference diagnostic tool images and associated user dialogues, such that the diagnostic data transfer device 104 can correspondingly automate the selection of the corresponding authored rule 134 in the diagnostic tool database 210.

In a further related embodiment, the image recognition algorithm can be provided by an image processing API/runtime library (which can be provided by a third-party provider), such as for example IOS VISION™ or IOS VISIONKIT™.

In a related embodiment, each authored rule 134 in the diagnostic tool database 210 can include:
a) a plurality of template fields 430, such that each template field 430 can include:
  i. a field location 431, which specifies a region 162 of the tool screen 108 wherein the diagnostic data value 114 can be located;
  ii. a field data type 432, which can include a category, industrial field, or object captured by the diagnostic tool 112; and
  iii. a field measurement unit 433;
  iv. a field name 436 (which can also be called a field title or field header); and
  v. a plurality 438 of field synonyms 439, which are each associated with the field name 436 (i.e., are synonyms of the field name 436).
wherein the diagnostic data transfer device 104 can be configured to optically scan a corresponding field location 431 on an image 117 of a corresponding user dialogue 113 on a tool screen 108, to extract a corresponding diagnostic data value 114.

In a related embodiment, the region specified by the field location 431 can be defined by a at least one vector 164, 166, which defines at least one vector position 164, 166, such that the vector position 164, 166 can be a set of coordinates along a set of axes that relate to the length and width of the tool screen 108 of the diagnostic tool 112, wherein the vector positions 164, 166 can be scaled to the image; wherein at least two opposing vectors 164, 166 can define a rectangular region 162 in which a diagnostic data value 114 is located; whereby, for example, a bottom left vector 164 positioned to the bottom left of a diagnostic data value 114 and a top right vector positioned to the top right of a diagnostic data value 114 can define a starting and an ending location for a rectangular region in which the diagnostic data value 114 is located.

In a further related embodiment, the image interpreter 310 of the diagnostic data transfer device 104 can be configured to optically scan a corresponding field location 431 for each field 430 to extract the corresponding diagnostic data value 114 using an optical character recognition (OCR) algorithm, such that the OCR algorithm can convert the image containing the diagnostic data values 114 into machine-readable data. The OCR algorithm can come from a 3rd party provider (such as providers in OCR libraries from Apple™ and Google™).

In yet another related embodiment, the OCR algorithm can take as input an image 117 and output textual data in arrays of lines, such that the diagnostic data transfer device 104 can map the values to the sequence of information returned from an OCR library, wherein the diagnostic data transfer device 104 can then analyze the arrays to find target keywords 436 and their corresponding values, such that if the target keyword is not found, the diagnostic data transfer device 104 can find the next index in the array based on target keywords. The dictionary matching can also be performed, such that, for example, the diagnostic data transfer device 104 can find 'Wheel' (i.e., Synonym 439) or 'Tyre' (i.e., Synonym 439) instead of 'Tire' (i.e., Name/Tire/Header 436). Additionally, any special characters can be removed to normalize the data.

In a further related embodiment, as shown in FIGS. 1A and 3, the diagnostic data transfer device 104 can be configured to process the image 117 using an optical character recognition algorithm 118 to generate a dialogue text 119; wherein the diagnostic data transfer device 104 is configured to search for a matching string 312 in the dialogue text 119, wherein the matching string 312 matches the field name 436 or a corresponding synonym 439 in the plurality 438 of synonyms 439 (i.e. the matching string 312 is a member of the union of the field name 436 and the plurality 438 of synonyms 439);

wherein the diagnostic data transfer device 104 is configured to extract a corresponding diagnostic data value 114 from a text portion 314 following the matching string in the dialogue text 119.

In a further related embodiment, the data captured by the OCR algorithm 118 can be augmented, such that, for example, if 'psi' was not found, but 'Tire' was found, the device could offer augmented 'units' to the user based on the make/model of the diagnostic tool 112.

In yet another related embodiment, topics such as dictionary matching, key pairs, and expected ranges can be authored in the diagnostic tool database 210, as part of the authored rules 134.

In a related embodiment, a specification alert can be provided where a value is highlighted if the value is not specified in the authored rules, such that the user 180 can correctly identify the value.

In a related embodiment, the diagnostic data transfer server 102 can include an authoring component 214, which can be web based, wherein the authoring component 214 can be used to create and edit authored rules 134 for diagnostic tools 112;

wherein the authoring component 214 can be configured to insert more diagnostic tools 112 into the diagnostic tool database 210, such that each new diagnostic tool 112 can have a new tool ID 412 and associated authored rules 134; whereby the authoring component 214 can enable users to quickly support new diagnostic tools 112 by creating the rules online and making them available to the diagnostic data transfer device 104.

In a related embodiment, each actual measurement data representation 120 can include:
a) a plurality of measurement fields 440, wherein each measurement field 440 can include:
  i. an actual measured value 441;
  ii. an actual data type 442, which can include a category, industrial field, or object measured by the diagnostic tool 112;
  iii. an actual measurement unit 443; and
  iv. a timestamp 444, such that the timestamp 444 can represent the time that the actual measured value 441 was extracted;
wherein the diagnostic data transfer device 104 can be configured to store a corresponding measurement field 440, wherein:
  the actual measured value 441 can be set to the corresponding diagnostic data value 114;
  the actual data type 442 can be set to the field data type 432;
  the actual measurement unit 443 can be set to the field measurement unit 433; and
  the timestamp 444 can be set to a current date and time.

Figure 5:
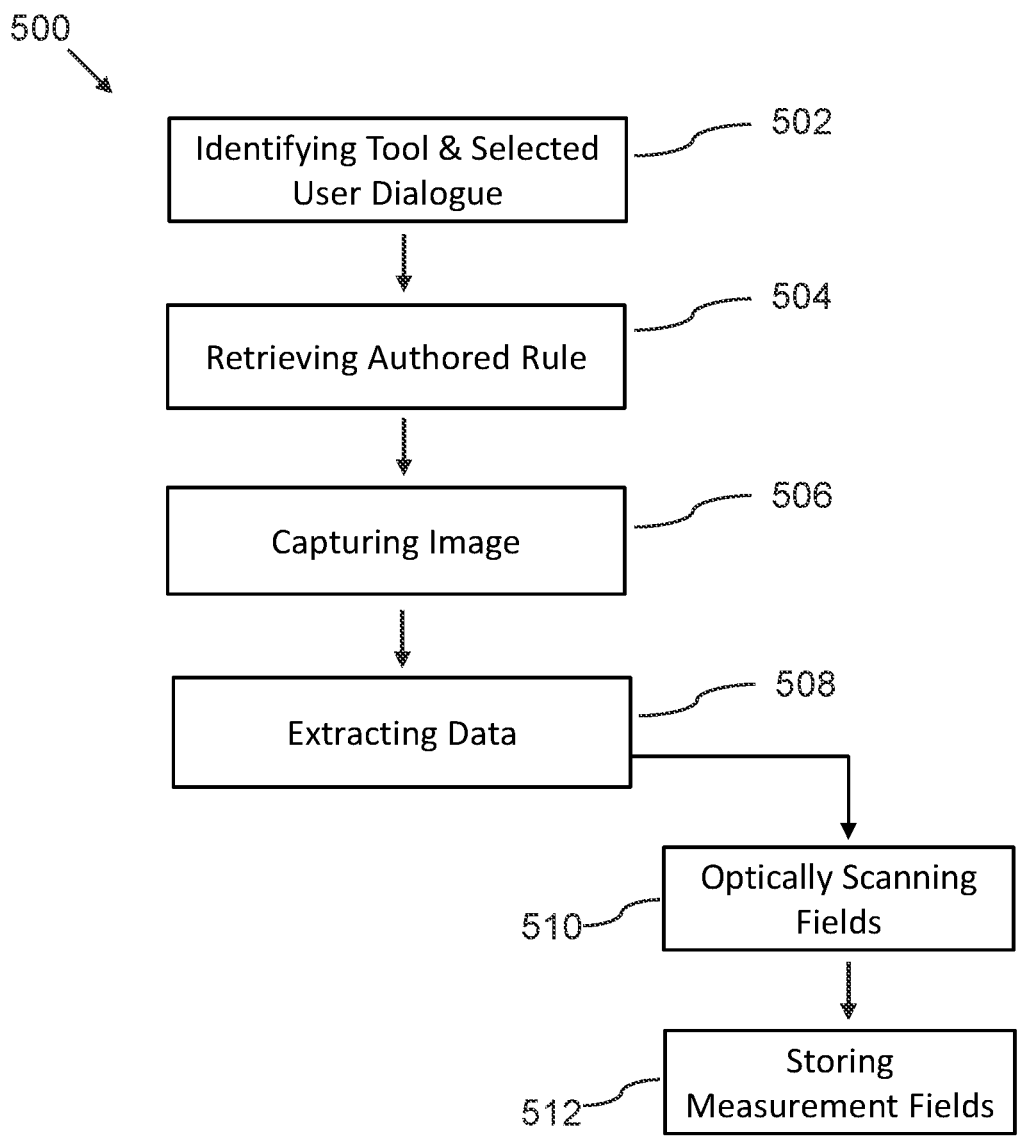
FIG. 5 is a flowchart illustrating steps that may be followed, in accordance with one embodiment of a method or process of diagnostic data transferring.

In an embodiment, as illustrated in FIG. 5, a method for diagnostic data transfer 500, can include:
a) Identifying a selected diagnostic tool 112 and a selected user dialogue 502 of the selected diagnostic tool 112;
b) retrieving a corresponding authored rule 504 from a diagnostic tool database 210, wherein the corresponding authored rule 134 can be associated with the selected user dialogue 113 of the selected diagnostic tool 112;
c) capturing an image 506 of a selected user dialogue 113 in a plurality of user dialogues 113, wherein the selected user dialogue 113 can be displayed on a tool screen 108 of a diagnostic tool 112, wherein the selected user dialogue 113 can include a plurality of displayed diagnostic data values 114;
d) extracting the plurality of diagnostic data values 508 from the image and transforming the plurality of diagnostic data values 114 into an actual measurement data representation 120; wherein extracting the plurality of diagnostic data values 508 can include for each template field 430 in the corresponding authored rule 134:
  i. optically scanning 510 a field location 431 of the image and extracting a corresponding diagnostic data value 114 from the field location 431; and
  ii. storing a corresponding measurement field 512 of the actual measurement data representation 120 with a corresponding measured value 441 set to the corresponding diagnostic data value 114.

In various related embodiments, the diagnostic data transfer system 100 can be employed for service & diagnostics in the automotive industry, such that the diagnostic data transfer system 100 can quickly and accurately transfer data from a tester or diagnostic tool by simply taking a picture of the display or the entire tool, using a portable device 104 with camera 115. The diagnostic data transfer system 100 thereby removes the need for hard coding to proprietary tool interfaces using wired or wireless connections, making the process quick and low cost. The diagnostic data transfer system 100 also makes interfacing substantially easier to maintain and adapt by virtue of the authored rules.

In related embodiments, the diagnostic data transfer system 100 can be implemented using various implementation approaches, which can include:
a) Client device 104 (e.g. phone) takes the picture of display of tester or diagnostic tool, applies the interpretation rules received from the server, extracts the data and presents to user or sends to the server;
b) Client device 104 (e.g. phone) takes the picture of display of tester or diagnostic tool, extracts all possible data from the image and sends to the server. The server applies the interpretation rules and sends the results to the client; and
c) Client device 104 (e.g. phone) takes the picture of display of tester or diagnostic tool, and sends the image to the server for interpretation and analysis. Once the data is extracted, the data is sent to the client for presentation or next steps.

In a related embodiment, server-side API and server-side logic can support the above three scenarios of analyzing the data gathered from the image and sending the data back to the client.

In related embodiments, the diagnostic data transfer device 104 can include configurations as:
a) A web application, executing in a Web browser;

b) A tablet app, executing on a tablet device, such as for example an ANDROID™ or IOS™ tablet device;

c) A mobile app, executing on a mobile device, such as for example an ANDROID™ phone or IPHONE™, or any wearable mobile device;

d) A desktop application, executing on a personal computer, or similar device; and/or e) An embedded application, executing on a processing device, such as for example a smart TV, a game console or other system.

It shall be understood that an executing instance of an embodiment of the diagnostic data transfer system 100, as shown in FIG. 1A, can include a plurality of diagnostic data transfer devices 104, which are each tied to one or more users 180.

An executing instance of an embodiment of the system for diagnostic data transfer 100, as shown in FIG. 1A, can similarly include a plurality of diagnostic data transfer servers 102.

FIGS. 1A, 1B, 2, 3 and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1A, 1B, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1A shows a depiction of an embodiment of the system for diagnostic data transfer 100, including the diagnostic data transfer server 102, and the diagnostic data transfer device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the . . . server 102 and the diagnostic data transfer device 104 are to be interpreted in the most general manner.

For example, the processors 202, 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the diagnostic data transfer server 102 and the diagnostic data transfer device 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the diagnostic data transfer device 104 communicates with the diagnostic data transfer server 102 over a network 106, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the diagnostic data transfer device 104, the diagnostic data transfer system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the diagnostic data transfer server 102 and the diagnostic data transfer device 104. The components of the diagnostic data transfer server 102 can be distributed over a plurality of physical, logical, or virtual servers. Parts or all of the components of the diagnostic data transfer device 104 can be configured to operate in the diagnostic data transfer server 102, whereby the diagnostic data transfer device 104 for example can function as a thin client, performing only graphical user interface presentation and input/output functions. Alternatively, parts or all of the components of the diagnostic data transfer server 102 can be configured to operate in the diagnostic data transfer device 104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A diagnostic data transfer system, comprising:
 a) a diagnostic tool, which comprises a tool screen and a plurality of user dialogues for display on the tool screen;
 b) a diagnostic data transfer device; and
 c) a plurality of general authored rules, such that each general authored rule in the plurality of general authored rules is associated with a user dialogue in the plurality of user dialogues;
 wherein the diagnostic data transfer device is configured to enable a user to capture an image of a selected user dialogue in the plurality of user dialogues, wherein the selected user dialogue is displayed on the tool screen of the diagnostic tool, wherein the selected user dialogue comprises a plurality of displayed diagnostic data values;
 such that the diagnostic data transfer device is configured to extract the plurality of diagnostic data values from the image and transform the image into an actual measurement data representation, which comprises the plurality of diagnostic data values;
 wherein the diagnostic data transfer device extracts the plurality of diagnostic data values by using a general authored rule in the plurality of general authored rules, wherein the general authored rule is associated with the selected user dialogue of the diagnostic tool.

2. The diagnostic data transfer system of claim 1, further comprising:
 a diagnostic data transfer server, which is configured to author and store the plurality of general authored rules; and receive, store, and transfer actual measurement data representations.

3. The diagnostic data transfer system of claim 2, further comprising:
 a service management system, wherein the diagnostic data transfer server is configured to send the actual measurement data representation to the service management system for processing of the actual measurement data representation in the service management system.

4. The diagnostic data transfer system of claim 1, wherein the diagnostic data transfer device further comprises:
 a) a processor;
 b) a non-transitory memory;
 c) an input/output;
 d) a camera, which is configured to capture the image;
 e) a device screen, which is configured to display the actual measurement data representation; and
 f) an image interpreter, which is configured to extract the plurality of diagnostic data values from the image; all connected via
 g) a data bus.

5. The diagnostic data transfer system of claim 2, wherein the diagnostic data transfer server further comprises:
 a) a processor;
 b) a non-transitory memory;
 c) an input/output component;
 d) an authoring component, which creates and edits the authored rules;
 e) a diagnostic tool database, which stores the plurality of general authored rules; and
 f) data measurement storage, which stores the actual measurement data representations; all connected via
 g) a data bus.

6. The diagnostic data transfer system of claim 1, wherein the diagnostic data transfer device further comprises:
 a diagnostic tool database, which comprises:
  a plurality of rule sets, wherein each rule set is associated with a corresponding diagnostic tool, wherein each rule set comprises:
   a plurality of corresponding authored rules, wherein each corresponding authored rule is associated with a corresponding user dialogue of the corresponding diagnostic tool;

wherein the diagnostic data transfer device is configured to identify a selected diagnostic tool and a selected user dialogue of the selected diagnostic tool;
such that the diagnostic data transfer device is configured to retrieve a corresponding authored rule from the diagnostic tool database, wherein the corresponding authored rule is associated with the selected user dialogue of the selected diagnostic tool.

7. The diagnostic data transfer system of claim 6, wherein each corresponding authored rule comprises a plurality of template fields, wherein each template field comprises:
   a) a field location, which specifies a region of the tool screen wherein a corresponding diagnostic data value is located;
   b) a field data type; and
   c) a field measurement unit;
   wherein the diagnostic data transfer device is configured to optically scan the field location in the image of the tool screen and extract the corresponding diagnostic data value.

8. The diagnostic data transfer system of claim 7, wherein each actual measurement data representation comprises, a plurality of measurement fields, wherein each measurement field comprises:
   a) an actual measured value;
   b) an actual data type;
   c) an actual measurement unit; and
   d) a timestamp;
   wherein the diagnostic data transfer device is configured to store a corresponding measurement field, wherein:
      the actual measured value is set to the corresponding diagnostic data value;
      the actual data type is set to the field data type;
      the actual measurement unit is set to the field data type; and
      the timestamp is set to a current date and time.

9. The diagnostic data transfer system of claim 6, wherein each corresponding authored rule comprises a plurality of template fields, wherein each template field comprises:
   a) a field data type;
   b) a field measurement unit;
   c) a field name; and
   d) a plurality of field synonyms, which are each associated with the field name.

10. The diagnostic data transfer system of claim 9, wherein the diagnostic data transfer device is configured to process the image using an optical character recognition algorithm to generate a dialogue text;
   wherein the diagnostic data transfer device is configured to search for a matching string in the dialogue text, wherein the matching string matches the field name or a corresponding synonym in the plurality of field synonyms;
   wherein the diagnostic data transfer device is configured to extract a corresponding diagnostic data value from a text portion following the matching string in the dialogue text.

11. A diagnostic data transfer system, comprising:
   a) a diagnostic data transfer server;
   b) a diagnostic tool, which comprises a tool screen and a plurality of user dialogues for display on the tool screen; and
   c) a diagnostic data transfer device;
   wherein the diagnostic data transfer device is configured to enable a user to capture an image of a selected user dialogue in the plurality of user dialogues, wherein the selected user dialogue is displayed on the tool screen of the diagnostic tool, wherein the selected user dialogue comprises a plurality of displayed diagnostic data values;
   wherein the diagnostic data transfer server is configured to receive the image from the diagnostic data transfer server, such that the diagnostic data transfer server is configured to extract the plurality of diagnostic data values from the image and transform the image into an actual measurement data representation, which comprises the plurality of diagnostic data values;
   wherein the actual measurement data representation is sent to the diagnostic data transfer device.

12. The diagnostic data transfer system of claim 11, wherein the diagnostic data transfer server further comprises:
   a diagnostic tool database, which comprises:
      a plurality of rule sets, wherein each rule set is associated with a corresponding diagnostic tool, wherein each rule set comprises:
         a plurality of corresponding authored rules, wherein each authored rule is associated with a corresponding user dialogue of the corresponding diagnostic tool;
   wherein the diagnostic data transfer device is configured to identify a selected diagnostic tool and a selected user dialogue of the selected diagnostic tool;
   such that the diagnostic data transfer server is configured to retrieve a corresponding authored rule from the diagnostic tool database, wherein the corresponding authored rule is associated with the selected user dialogue of the selected diagnostic tool.

13. The diagnostic data transfer system of claim 12, wherein each corresponding authored rule comprises a plurality of template fields, wherein each template field comprises:
   a) a field location, which specifies a region of the tool screen wherein a corresponding diagnostic data value is located;
   b) a field data type; and
   c) a field measurement unit;
   wherein the diagnostic data transfer device is configured to optically scan the field location in the image of the tool screen and extract the corresponding diagnostic data value.

14. The diagnostic data transfer system of claim 13, wherein each actual measurement data representation comprises, a plurality of measurement fields, wherein each measurement field comprises:
   a) an actual measured value;
   b) an actual data type;
   c) an actual measurement unit; and
   d) a timestamp;
   wherein the diagnostic data transfer device is configured to store a corresponding measurement field, wherein:
      the actual measured value is set to the corresponding diagnostic data value;
      the actual data type is set to the field data type;
      the actual measurement unit is set to the field measurement unit; and
      the timestamp is set to a current date and time.

15. A method of diagnostic data transfer by using a diagnostic data transfer system, the method comprising:
   a) capturing an image of a selected user dialogue in a plurality of user dialogues, wherein the selected user dialogue is displayed on a tool screen of a diagnostic tool, wherein the selected user dialogue comprises a plurality of displayed diagnostic data values; and b) extracting the plurality of diagnostic data values from the image and transforming the plurality of diagnostic data values into an actual measurement data representation;

wherein the diagnostic data transfer system, comprises:
the diagnostic tool, which comprises the tool screen and the plurality of user dialogues for display on the tool screen;
a diagnostic data transfer device; and
a plurality of general authored rules, such that each general authored rule in the plurality of general authored rules is associated with a user dialogue in the plurality of user dialogues;

wherein the diagnostic data transfer device is configured to enable a user to capture the image of the selected user dialogue in the plurality of user dialogues, wherein the selected user dialogue is displayed on the tool screen of the diagnostic tool, wherein the selected user dialogue comprises a plurality of displayed diagnostic data values;

such that the diagnostic data transfer device is configured to extract the plurality of diagnostic data values from the image and transform the image into an actual measurement data representation, which comprises the plurality of diagnostic data values;

wherein the diagnostic data transfer device extracts the plurality of diagnostic data values by using a general authored rule in the plurality of general authored rules, wherein the general authored rule is associated with the selected user dialogue of the diagnostic tool.

16. The method of diagnostic data transfer of claim 15, further comprising:
a) identifying a selected diagnostic tool and the selected user dialogue of the selected diagnostic tool; and
b) retrieving a corresponding authored rule from a diagnostic tool database, wherein the corresponding authored rule is associated with the selected user dialogue of the selected diagnostic tool.

17. The method of diagnostic data transfer of claim 16, wherein the diagnostic tool database comprises:
a plurality of rule sets, wherein each rule set is associated with a corresponding diagnostic tool, wherein each rule set comprises:
a plurality of corresponding authored rules, wherein each corresponding authored rule is associated with a corresponding user dialogue of the corresponding diagnostic tool.

18. The method of diagnostic data transfer of claim 17, further comprising:
optically scanning a field location and extracting a corresponding diagnostic data value;
wherein each corresponding authored rule comprises a plurality of template fields,
wherein each template field comprises:

a) the field location, which specifies a region of the tool screen wherein a corresponding diagnostic data value is located;
b) a field data type; and
c) a field measurement unit.

19. The method of diagnostic data transfer of claim 18, further comprising:
storing a corresponding measurement field;
wherein each actual measurement data representation comprises, a plurality of measurement fields, wherein each measurement field comprises:
an actual measured value;
an actual data type;
an actual measurement unit; and
a timestamp;
wherein the corresponding measurement field, comprises:
the actual measured value, which is set to the corresponding diagnostic data value;
the actual data type, which is set to the field data type;
the actual measurement unit, which is set to the field data type; and
the timestamp, which is set to a current date and time.

20. A method of diagnostic data transfer by using a diagnostic data transfer system, the method comprising:
a) capturing an image of a selected user dialogue in a plurality of user dialogues, wherein the selected user dialogue is displayed on a tool screen of a diagnostic tool, wherein the selected user dialogue comprises a plurality of displayed diagnostic data values; and
b) extracting the plurality of diagnostic data values from the image and transforming the plurality of diagnostic data values into an actual measurement data representation;

wherein the diagnostic data transfer system, comprises:
a diagnostic data transfer server;
the diagnostic tool, which comprises the tool screen and the plurality of user dialogues for display on the tool screen; and
a diagnostic data transfer device;

wherein the diagnostic data transfer device is configured to enable a user to capture an image of a selected user dialogue in the plurality of user dialogues, wherein the selected user dialogue is displayed on the tool screen of the diagnostic tool, wherein the selected user dialogue comprises a plurality of displayed diagnostic data values;

wherein the diagnostic data transfer server is configured to receive the image from the diagnostic data transfer server, such that the diagnostic data transfer server is configured to extract the plurality of diagnostic data values from the image and transform the image into an actual measurement data representation, which comprises the plurality of diagnostic data values;

wherein the actual measurement data representation is sent to the diagnostic data transfer device.

* * * * *